United States Patent [19]

Hefner, Jr. et al.

[11] Patent Number: 4,782,124
[45] Date of Patent: Nov. 1, 1988

[54] POLYCARBONATE MODIFIED EPOXY RESINS

[75] Inventors: Robert E. Hefner, Jr., Lake Jackson; Deborah I. Haynes, Freeport; Manuel C. Tyler, Jr., Angleton, all of Tex.

[73] Assignee: The Dow Chemical Company, Midland, Mich.

[21] Appl. No.: 39,192

[22] Filed: Apr. 14, 1987

[51] Int. Cl.$^4$ .................... C08F 283/02; C08L 63/00
[52] U.S. Cl. .................................. 525/463; 525/523
[58] Field of Search ............... 525/463, 523; 528/106, 528/370

[56] References Cited

U.S. PATENT DOCUMENTS 3,098,056  7/1963  Schnell et al. ............... 525/463

FOREIGN PATENT DOCUMENTS 0138389  4/1985  European Pat. Off. .
0125245  8/1982  Japan .

Primary Examiner—Theodore E. Pertilla
Attorney, Agent, or Firm—B. G. Colley

[57] ABSTRACT

Modified epoxy resins are prepared by the reaction of one or more epoxy resins with polycarbonate resins or oligomers. One or more monoalcohols and/or monophenols can also be used in the modification reaction. The epoxy resins also can be advanced by inclusion of a polyphenol during the reaction. The modified epoxy resins have a chain branching and/or crosslinking due to carbonate bonding of polycarbonate chain scission products to the epoxy resin. The epoxy resins are useful to make powder coatings with enhanced adhesion to metal and resistance to cathodic disbondment.

23 Claims, No Drawings

POLYCARBONATE MODIFIED EPOXY RESINS

BACKGROUND OF THE INVENTION

The present invention provides novel polycarbonate modified epoxy resins, as well as cured compositions prepared from said epoxy resins.

Conventional advancement chemistry, wherein an epoxy resin, such as a diglycidyl ether of bisphenol A, and a polyphenol, such as bisphenol A, are reacted provides advanced epoxy resins which are useful to prepare cured (thermoset) products. Although this advancement reaction provides a useful product, it also consumes epoxide groups while increasing molecular weight, thus decreasing curability, reactivity, corrosion resistance, crosslink density in the cured product, and the like.

The present invention provides polycarbonate modified epoxy resins which possess a substantially increase epoxide content per unit molecular weight thus restoring curability, reactivity, corrosion resistance, crosslink density in the cured product, and the like while simultaneously maintaining the benefits of higher molecular weight, notably increased mechanical strength. Enhanced adhesion to metal and resistance to cathodic disbondment are obtained with cured powder coating compositions prepared from the polycarbonate modified epoxy resins of the present invention.

SUMMARY OF THE INVENTION

One aspect of the present invention pertains to epoxy resin compositions comprising
(1) one or more epoxy resins with
(2) from about 0.1 to about 10.0% by weight based on the total weight of the product of a polycarbonate resin or oligomer
whereby said epoxy resin is linked by one or more carbonate bonds to the transesterification induced chain scission products of said polycarbonate to provide chain branching and/or crosslinking of said epoxy resin.

Another aspect of the present invention concerns thermosettable (curable) compositions prepared by combining one or more of the epoxy resin compositions with a curing quantity of at least one suitable curing agent and/or catalyst therefor.

Still another aspect of the present invention pertains to the products and compositions resulting from curing the aforementioned thermosettable compositions.

DETAILED DESCRIPTION OF THE INVENTION

Suitable epoxy resins useful in the preparation of the polycarbonate modified epoxy resin compositions include, for example, those represented by the formulas I-V.

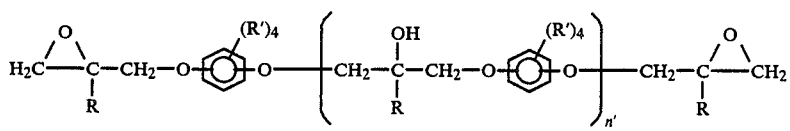

FORMULA I

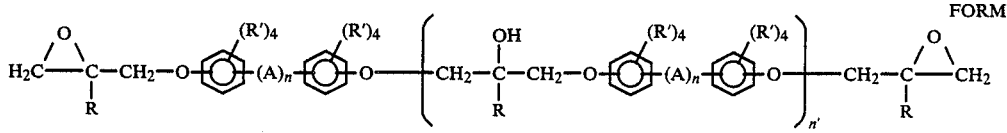

FORMULA II

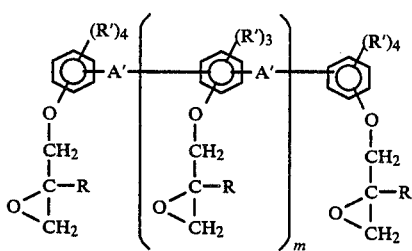

FORMULA III

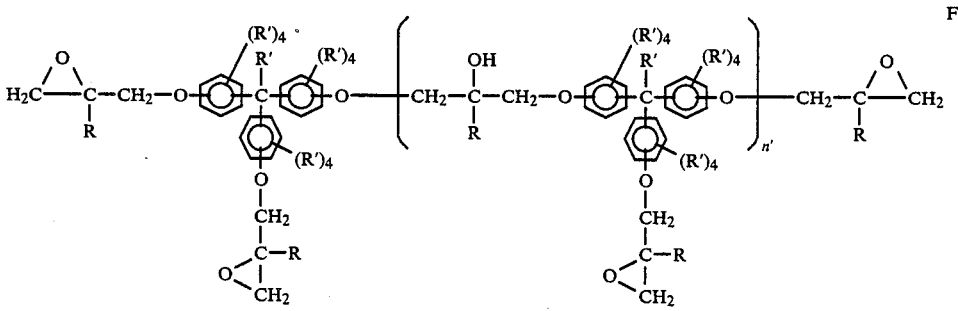

FORMULA IV

FORMULA V

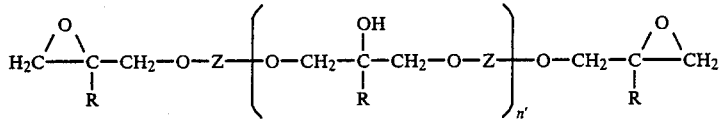

wherein A is a divalent hydrocarbon group having from 1 to about 12, preferably from 1 to about 6 carbon atoms,

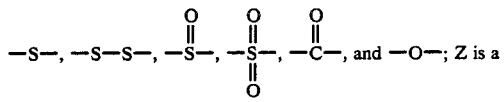

hydrocarbyl group containing from 1 to about 15 carbon atoms or a $-C(R'')_2-C(R'')_2-[O-C(R''-)_2-C(R'')_2]-_{m'}$ group; A' is a divalent hydrocarbon group having from 1 to about 3, preferably 1, carbon atoms or a

group; p has a value from zero to about 10, preferably from zero to 3; each R' is independently hydrogen, a hydrocarbyl or hydrocarbyloxy group having from 1 to 18 carbon atoms or a halogen, preferably chlorine or bromine; R is independently hydrogen or a hydrocarbyl group having from 1 to about 3 carbon atoms; each R'' is independently hydrogen or a hydrocarbyl group having from 1 to about 6 carbon atoms; n has a value from zero or 1; n' has a value from zero to about 40, preferably from 0.1 to about 5; m' has a value from 1 to about 100, preferably from 1 to about 25 and m has a value from about 0.001 to about 6.

The term hydrocarbyl as employed herein means any aliphatic, cycloaliphatic, aromatic, aryl substituted aliphatic, or aliphatic substituted aromatic groups. Likewise, the term hydrocarbyloxy group means a hydrocarbyl group having an oxygen linkage between it and the object to which it is attached.

Suitable epoxy resins which can be employed herein include, for example, the diglycidyl ethers of resorcinol, hydroquinone, catechol, bisphenol A (4,4'-isopropylidenediphenol), 4,4'-dihydroxydiphenyl methane,2,2'-bis-(4-hydroxyphenyl)pentane, 3,3',5,5'-tetramethyl-4,4'-dihydroxydiphenyl, 4,4'-dihydroxydiphenyl sulfone, 4,4'-dihydroxybenzophenone, 3,3',5,5'-tetrabromo-4,4'-bis(p-hydroxyphenyl)diphenyl ether, 4,4'-dihydroxydiphenyl sulfide; the phenol-formaldehyde condensation products (novolacs); phenol-dicyclopentadiene condensation products; tris(hydroxyphenyl)methane; diglycidyl ethers of ethylene glycol, propylene glycol, diethylene glycol, dipropylene glycol, triethylene glycol, tripropylene glycol, butyleneglycol, polyethylene glycols, polypropylene glycols, polybutylene glycols, 1,12-dihydroxydodecane, 1,2-dihydroxyundecane, 1,6-hexanediol, 1,3-dihydroxy-2,2-dimethyl propane; diglycidyl ethers of cyclohexane dimethanol, dicyclopentadiene dimethanol, cyclohexanediol, norbornane dimethanol, hydrogenated bisphenol A; mixtures thereof and the like. Most preferred are the diglycidyl ethers of bisphenol A, 4,4'-dihydroxydiphenyl methane and mixtures of the diglycidyl ether of bisphenol A with the diglycidyl ether of dipropylene glycol or a polypropylene glycol.

Suitable polycarbonates or polycarbonate oligomers are produced using methods well known to the prior art. Typical of such methods are those reported in *Encyclopedia of Polymer Science and Technology*, Volume 10, pages 710-764 (1969) published by John Wiley and Sons, Inc. and *Kirk-Othmer Encyclopedia of Chemical Technology*, Third Edition, Volume 18, pages 479-494 (1982) published by John Wiley and Sons, Inc. and incorporated herein by reference.

Preferred as the polycarbonate or polycarbonate oligomers are the aromatic polycarbonates or aromatic polycarbonate oligomers possessing phenolic hydroxyl, carboxylic acid or a mixture of said hydroxyl and carboxylic acid functionalities, non-reactive terminating groups, mixtures thereof and the like. Most preferred are aromatic polycarbonates or polycarbonate oligomers possessing phenolic hydroxyl terminal groups or possessing chain terminating groups derived from monophenols or substituted monophenols.

Preparation of a typical bisphenol A terminated polycarbonate oligomer preferred for use herein is taught by the examples. In the preparation, phosgene and bisphenol A are reacted in a specific manner to provide said phenolic hydroxyl terminated polycarbonate oligomer. Likewise, carboxylic terminated polycarbonate oligomers for use herein may be prepared by inclusion of p-hydroxybenzoic acid (or disodium salt of p-hydroxybenzoic acid) as a reactant. Various chain terminating agents, such as p-t-butylphenol, may also be included in the reaction.

Although less preferred, polyestercarbonates are also suitable for use herein. Preferred polyestercarbonates are the aromatic polyestercarbonate or aromatic polyestercarbonate oligomers possessing phenolic hydroxyl, carboxylic acid or a mixture of said hydroxyl and carboxylic acid functionalities, non-reactive terminating groups, mixtures thereof and the like. Most preferred are aromatic polyestercarbonates or aromatic polyestercarbonate oligomers possessing phenolic hydroxyl terminal groups or possessing chain terminating groups derived from monophenols or substituted monophenols.

If desired, one or more polyphenols may be used in the process of the present invention. Suitable polyphenols useful in the preparation of the polycarbonate modified epoxy resin compositions include, for example, those represented by the formulas

FORMULA VI

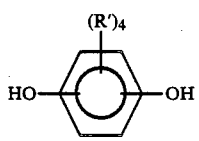

FORMULA VII

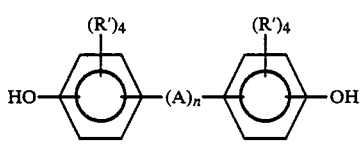

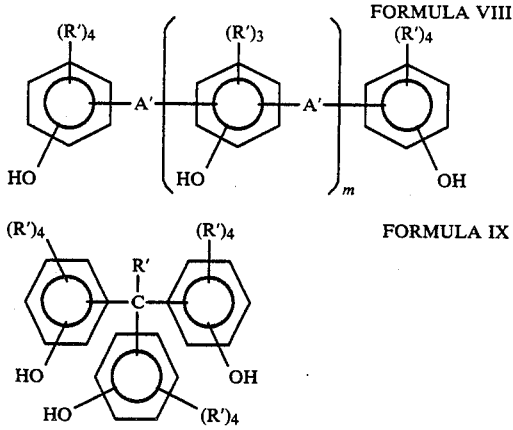

FORMULA VIII

FORMULA IX wherein A, A', R', n and m as hereinbefore defined.

Suitable polyphenols which can be employed herein include, for example, o-, m-, p-dihydroxybenzene, bisphenol A (4,4'-isopropylidenediphenol), 4,4'-dihydroxydiphenyl methane, 3,3',5,5'-tetramethyl-4,4'-dihydroxydiphenol, 4,4'-dihydroxydiphenyl sulfone, 4,4'-dihydroxy benzophenone, 3,3',5,5'-tetrabromo-4,4'-isopropylidenediphenol, 4,4'-bis(p-hydroxyphenyl)diphenyl ether, 4,4'-dihydroxydiphenyl sulfide, phenol-formaldehyde condensation products (novolacs), phenoldicyclopentadiene condensation products, dicyclopentadiene diphenol, tricyclopentadiene diphenol, tris(hydroxyphenyl)methane, mixtures thereof and the like. Most preferred are bisphenol A and 4,4'-dihydroxydiphenyl methane.

An amount of polyphenols of from about 0.01 to about 0.99 hydroxyl equivalents per epoxide equivalent contained in the epoxy resin reactant is typically used. An amount of from about 0.25 to about 0.75 hydroxyl equivalents per epoxide equivalent is preferred.

A transesterification catalyst may optionally be employed to facilitate reaction of the secondary aliphatic hydroxyl groups present on the epoxy resin backbone with a polycarbonate or polycarbonate oligomer. Suitable transesterification catalysts which can be employed herein include, for example, dibutyltin laureate, dibutyltin oxide, tin octoate, tin oxide, $Sb_2O_3$, $Mn(CH_3CO_2)_2$, $Ca(CH_3CO_2)_2$, $Ti(OCH(CH_3)_2)_4$ mixtures thereof and the like. An amount of about 0.01 to about 2 percent by weight based on polycarbonate used is typically employed.

A monoalcohol or monophenol may optionally be employed as a reactant useful for modification of the polycarbonate or polycarbonate oligomer chain length. The monoalcohol or monophenol can be prereacted with the polycarbonate or polycarbonate oligomer prior to its reaction with an epoxy resin. Alternately, a monoalcohol or monophenol can be used as a coreactant with the polycarbonate and epoxy resin. It is also operable to prereact the monophenol with the epoxy resin. This provides secondary aliphatic hydroxyl groups on the epoxy resin backbone which are available for reaction with the polycarbonate resin or oligomer. Primary and secondary monoalcohols are most preferred. Suitable monoalcohols are those having 1 to 36 carbon atoms and include 1,3-diphenoxy-2-propanol, n-butanol, hexanol, octanol, 2-ethyl-1-hexanol, methanol, stearyl alcohol and mixtures thereof. Suitable monophenols which can be employed herein are those having 6 to 36 carbon atoms and include p-methoxyphenol, naphthol, phenol, t-butyl phenol, nonyl phenol, and mixtures thereof. It is also operable to use mixtures of one or more monoalcohols and one or more monophenols herein. An amount of about 1.0 to about 250 percent by weight based on polycarbonate used is typically employed for both the monoalcohols and the monophenols. As is typical in transesterification chemistry, an excess of monoalcohol, for example, can be used to promote the transesterification reaction of the monoalcohol and polycarbonate. The excess of monoalcohol is then typically removed via conventional unit operations, such as vacuum stripping or distillation.

The polycarbonate or polycarbonate oligomer may be used neat or may be dissolved or slurried into a solvent inert to reaction with epoxide groups or the carbonate linkage. Useful solvents are halogenated hydrocarbons, aromatic hydrocarbons and aliphatic ketones. However, methylene chloride is preferred. It is most preferred to utilize the polycarbonate neat.

An advancement catalyst may be used in the process of the present invention. Suitable advancement catalysts which can be employed herein include most any catalyst which will catalyze the reaction between a vicinal epoxy group and a phenolic hydroxyl group or carboxylic acid group. An amount of from about 0.001 to about 1.0 percent by weight based on epoxy resin used is typically employed. Such catalysts include, for example, those disclosed in U.S. Pat. Nos. 3,306,872; 3,341,580; 3,379,684; 3,477,990; 3,547,881; 3,637,590; 3,843,605; 3,948,855; 3,956,237; 4,048,141; 4,093,650; 4,131,633; 4,132,706; 4,171,420; 4,177,216 which are incorporated herein by reference.

Particularly suitable catalysts are the quarternary phosphonium and ammonium compounds such as, for example, ethyltriphenylphosphonium chloride, ethyltriphenylphosphonium bromide, ethyltriphenylphosphonium iodide, ethyltriphenylphosphonium acetate, ethyltriphenylphosphonium acetate.acetic acid complex, ethyltriphenylphosphonium phosphate, tetrabutylphosphonium chloride, tetrabutylphosphonium bromide, tetrabutylphosphonium iodide, tetrabutylphosphonium acetate, tetrabutylphosphonium acetate.acetic acid complex, butyltriphenylphosphonium tetrabromobisphenate, butyltriphenylphosphonium bisphenate, butyltriphenylphosphonium bicarbonate, benzyltrimethylammonium chloride, tetramethylammonium hydroxide, mixtures thereof and the like.

The reaction to produce the polycarbonate modified epoxy resin is usually conducted at a temperature of from about 75° C. to about 250° C., preferably from about 125° C. to about 220° C. for from about 15 minutes to about 480 minutes, preferably from about 30 minutes to about 120 minutes.

The term modified as used herein to describe the polycarbonate modified epoxy resin refers to the transesterification reaction occurring between aliphatic hydroxyl groups, present in the epoxy resin and carbonate groups present in the polycarbonate or polycarbonate oligomer chains. One result of this reaction is the formation of one or more new carbonate linkages that chemically bond the epoxy resin and the chain scission products of the polycarbonate or polycarbonate oligomer. It follows that transesterification reaction between one aliphatic hydroxyl group in one epoxy resin molecule and a single chain of polycarbonate provides a branched epoxy resin molecule. Similarly, it follows that transesterification reaction between two separate aliphatic hydroxyl groups separately located on two epoxy resin molecules and a single chain of polycarbonate provides a crosslink between said epoxy resin molecules.

A wide variety of process configurations are useful for preparing the polycarbonate modified epoxy resins of the present invention. In the preferred processes of the present invention, the polycarbonate or polycarbonate oligomers are first added to the molten epoxy resin and substantially dissolved therein. The advancement catalyst, if used, may be added before, after, or concurrently with the polycarbonate or polycarbonate oligomers although it is most preferably added after the polycarbonate or polycarbonate oligomers have been substantially dissolved in the molten epoxy resin. When a transesterification catalyst is used, it may be added before, after or concurrently with the polycarbonate or polycarbonate oligomers, although it is preferably added after the polycarbonate or polycarbonate oligomers have been substantially dissolved in the molten epoxy resin. It is most preferred that a transesterification catalyst is not used. When a monoalcohol, monophenol or mixture thereof is used, it may be added before, after or concurrently with the polycarbonate or polycarbonate oligomers, although it is preferably added concurrently with or after the polycarbonate oligomers have been added to the molten epoxy resin.

In a most preferred process of the present invention, the polycarbonate or polycarbonate oligomers are added to the molten epoxy resin and substantially dissolved therein. A polyphenol is added before, after, or concurrently with the polycarbonate or polycarbonate oligomers and substantially dissolved therein, although it is most preferably added after the polycarbonate or polycarbonate oligomers have been substantially dissolved in the molten epoxy resin. An advancement catalyst may be added at any point in the above sequence although it is most preferably added after the polycarbonate or polycarbonate oligomers and after the polyphenol have been substantially dissolved in the molten epoxy resin.

It is also operable to add portions of various of the reactants in stages. As a specific example, a portion of a polyphenol is added to the molten epoxy resin and substantially dissolved therein. An advancement catalyst is then added and the epoxy resin is partially or totally advanced via reaction with the added portion of polyphenol. The polycarbonate or polycarbonate oligomers are added to the molten partially or totally advanced epoxy resin and substantially dissolved therein. A second portion of polyphenol is then added, either with or without additional advancement catalyst, and reacted therein.

One or more solvents which are substantially inert to reaction with the epoxide group, carbonate linkage and phenolic hydroxyl or carboxylic acid groups, if present, may be used in the process of the present invention. Said solvents include the aromatic hydrocarbons, such as toluene, xylene; the chlorinated aliphatic hydrocarbons, such as perchloroethylene, methyl chloroform; the aliphatic ketones, such as methylisobutyl ketone, methylamyl ketone; the aliphatic ethers such as 1,4-dioxane, mixtures thereof and the like. A solvent may be used for many known purposes such as to reduce viscosity of the product or as a carrier for one or more of the reactants.

The products of the present invention are polycarbonate modified epoxy resins containing carbonate linkages between the epoxy resin and the transesterification induced chain scission products of the polycarbonate or polycarbonate oligomer. These linkages are formed via transesterification reaction between the hydroxyl groups in the epoxy resin and carbonate groups in the polycarbonate or polycarbonate oligomer chains. Sources of hydroxyl groups in the epoxy resins include the characteristic secondary aliphatic hydroxyl groups present in the epoxy resin backbone as a result of advancement reaction and glycol groups (1,2-diol) present as a result of epoxide group hydrolysis. If the polycarbonate or polycarbonate oligomer contains terminal phenolic hydroxyl and/or carboxylic acid groups, these are also incorporated into the epoxy resin via conventional advancement reaction with epoxide groups. Furthermore, phenolic hydroxyl terminated polycarbonate chain scission products which form as a coproduct of the aforesaid transesterification reaction can also be incorporated into the epoxy resin via conventional advancement reaction with epoxide groups and thus lead to an additional supply of reactive secondary aliphatic hydroxyl groups within the epoxy resin. The following model reaction clearly demonstrates the transesterification reaction between the carbonate linkage and a secondary aliphatic hydroxyl group such as is present on the epoxy resin backbone or such as may be induced by the optional use of a secondary monoalcohol as a co-reactant:

MODEL REACTION OF SECONDARY HYDROXYL GROUP AND AROMATIC CARBONATE GROUP

A portion of 1,3-diphenoxy-2-propanol and diphenyl carbonate were mixed together at a 2:1 equivalent ratio then heated to 100° C. After 1 hour of reaction, a sample of the reaction product was analyzed by gas chromatography for disappearance of diphenyl carbonate. The gas chromatographic analysis demonstrated that disappearance of 27.8 percent by weight of the diphenyl carbonate had occurred. Reaction was attributed to transesterification reaction between the secondary hydroxyl group of 1,3-diphenoxy-2-propanol and the carbonate linkage of diphenyl carbonate.

The polycarbonate modified epoxy resin compositions may be cured using a suitable amount of one or more curing agents and/or catalysts therefor. Suitable such curing agents are described in the *Handbook of Epoxy Resins,* by Lee and Neville, 1967, McGraw-Hill which is incorporated herein by reference.

The polycarbonate modified epoxy resin compositions may be compounded with solvents, pigments, fire suppressants, low profile additives, fillers, or other resinous products and cured to form useful products.

The polycarbonate modified epoxy resins of the present invention are useful to make laminates, castings, coatings, encapsulations and the like. The laminates are made by curing the aforesaid epoxy resin to which a suitable fibrous reinforcement such as asbestos fibers, carbon fibers, fibrous glass, aramid fibers or inorganic fibers has been added. The fibers may be in the form of mats, strands, sheets, filaments, yarns, chopped strands, ribbons and the like. The aforesaid epoxy resin formulation can be rolled, sprayed or impregnated into the fibrous reinforcement.

A preferred use for the non-sintering polycarbonate modified epoxy resins of the present invention is in the preparation of powder coatings. The powder coating formulations of the present invention are prepared using the aforesaid epoxy resin compositions and a suitable curing agent therefor. Said curing agents should be substantially non-sintering and exhibit latency at the formulating temperatures and conditions employed. Suitable such curing agents are described in the aforementioned *Handbook of Epoxy Resins*. Representative of the curing agents are the polyphenols or the polyphenol and epoxy resin adducts, boro trifluoride-amine complexes, polycarboxylic acids or anhydrides, the guanamines, guanidines, hydrazines, dihydrazides, melamines, carboxylic acid and/or hydroxyl functional polyesters, substituted areas and biguanides, such as dicyandiamide or dicyandiamide derivatives. Most preferred as the curing agent is dicyandiamide or a bisphenol A and diglycidyl ether of bisphenol A adduct.

Formulating methods well known to the prior art are employed to prepare the powder coating formulations of the present invention. Preparation of typical epoxy resin based powder coating formulations is described in *Fundamentals of Powder Coating* by Miller and Taft, 1974, Society of Manufacturing Engineers, Dearborn, Mich. which is incorporated herein by reference.

In the general method of preparation, the solid epoxy resin product is flaked or ground then dry mixed or blended with a non-sintering curing agent and optionally, one or more curing agent accelerators or catalysts, particulate fillers, pigments, flow control agents, gloss control additives, texture control additives and air release agents. The dry mixed product is then hot melt blended typically by use of a kneading-type extruder. The extruded product passes through chilled rollers and is then recovered and crushed to a rough powder. Further grinding to a fine powder is accomplished via use of a high speed hammer mill or other type of grinding equipment. The resulting fine powder may be subjected to a size classification step to recover the desired range of product particle size. The desired product size distribution for the product may vary depending on the intended end use of the product, but generally, sizes between about 80 mesh to about 325 mesh are most desired. Well known methods that are suitable for use in size classifying powder coating formulations include screening and air classification.

The resulting powder coating formulation is applied to the substrate to be coated using methods well known to the prior art. These methods are delineated in detail by the aforementioned Miller and Taft reference and include powder dusting, fluidized bed processes, electrostatic powder spraying, electrostatic fluidized bed processes, and others.

The powder coated article is cured using methods and conditions well known to the prior art. This typically involves heating in an oven for an amount of time sufficient to complete the cure. When dicyandiamide is the curing agent and 2-methylimidazole is the curing agent accelerator used with the epoxy resin compositions of the present invention, curing times of about 1 minute to about 30 minutes at reaction temperatures of from about 150° to about 250° C. are generally sufficient.

The powder coating formulation optionally, although preferably, contains one or more curing agent accelerators or catalysts. Suitable such curing agent accelerators or catalysts are described in the aforementioned *Handbook of Epoxy Resins* and *Fundamentals of Powder Coating* references. Representative of these curing agent accelerators or catalysts are the amino substituted pyridines, imidazoles, metallic salts, tertiary amines, phenols, mixtures thereof and the like. Most preferred as the curing agent accelerator for use with a dicyandiamide curing agent is 2-methyl-imidazole.

The powder coating formulation optionally, although preferably, contains one or more particulate fillers. Fillers are used in powder coatings for a wide range of purposes, primary of which is economic, i.e. as a less expensive diluent. Other properties imparted by fillers can include one or more of the following: handling and processing properties, impact modification, dimensional stability, moisture and chemical resistance, flame resistance, modified thermal conductivity, modified electrical properties, modified rheology, color modification and texture modification. Suitable such fillers are described in *Non-Fibrous Fillers for Epoxy Resin Formulations* presented at the 7th Electrical Insulation Conference, Chicago, Ill., Oct. 15–19, 1967 by D. A. Shimp. Representative of these fillers are barytes ($BaSO_4$), titanium dioxide, carbon black, silica flour, calcium carbonate, mixtures thereof and the like. The particle size distribution, shape, chemical composition, surface area and use level, i.e. resin to filler ratio, can be adjusted singularly or collectively to change the resultant cured powder coating. Simple preliminary experiments within the normal capability of those skilled in the art are ordinarily performed to aid in filler choice.

The powder coating formulation optionally contains one or more pigments. Said pigments are typically used to add color to the cured powder coating. Suitable such pigments are described in *Pigments for Colouring Epoxy Powder Coatings* by Maltman and Deverell-Smith in Pigment and Resin Technology, November 1973, pp. 15–19 which is incorporated herein by reference.

The powder coating formulation optionally, although preferably, contains one or more flow control agents. Flow control agents are used in powder coatings to adjust the rheological properties of the total powder coating formulation thus insuring uniform coating film thickness, wet-out and coating of edges. Suitable such flow control agents are described in *Acrylic Flow Control Agents for the Coating Industry* by Skora in Polymers Paint and Colour Journal, Sept. 5, 1979, pp. 867–870 which is incorporated herein by reference. Most preferred as the flow control agents are the polyacrylates such as, for example, ethyl acrylate and 2-ethylhexyl acrylate copolymer, and poly(butyl acrylate).

The powder coating formulation optionally contains one or more texture control additives. Texture control additives are used in powder coatings to modify the surface characteristics of the cured powder coating. Materials which provide smooth or rough surface finishes may be employed. Glass microspheres, metal powders and polymeric powders are examples of the types of additives capable of modifying the powder coating surface to a textured finish.

The powder coating formulation optionally contains one or more air release agents. Said agents are used in powder coatings to alleviate surface defects, such as pinholes in the cured powder coating, induced by air entrainment. A most preferred air release agent is benzoin, as described in *Surface Coatings, Vol. 2—Paints and their Application* by the Oil and Colour chemists' Association, Australia, published by Chapman and Hall, 1984, p. 598 which is incorporated herein by reference.

The powder coating formulation optionally contains one or more gloss control additives. Gloss control additives are used to reduce the high degree of reflected light from the typical cured epoxy resin surface. Suitable such gloss control agents are certain amorphous silicas, silicic acid and the curing agent system consisting of a salt of a polycarboxylic acid and a cyclic amidine as taught by U.S. Pat. No. 3,947,384 which is incorporated herein by reference.

Other additives or adjuvants may be incorporated into the powder coating formulations of the present invention for their known and intended use therein. One such additive is a slip aid, as described in the aforementioned *Surface Coatings* reference.

The powder coating product of the present invention when cured provides a coating over a substrate such as steel which thus forms a tough protective barrier.

The following examples are illustrative of the present invention and are not to be construed as to limiting the scope thereof in any manner.

EXAMPLE 1

A.

Preparation of Bisphenol A Terminated Polycarbonate Oligomers

Bisphenol A (272.4 grams), methylene chloride (1000 milliliters), water (1350 milliliters) and 50 percent aqueous sodium hydroxide (194.0 grams) were added to a reactor and rapidly stirred. A total of 150.0 grams of phosgene and 96.0 grams of 50 percent aqueous sodium hydroxide solution were fed into the reaction mixture. The first 89.0 grams of phosgene were fed into the reactor over a 17.5 minute period during which time the reaction temperature was allowed to increase from 25° C. to 30° C. The aqueous sodium hydroxide solution was fed into the reactor over a 27 minute period at which time 137.0 grams of phosgene had been fed. A final pH of 11 was achieved at the end of the phosgene addition. Thirty-two minutes after the inception of the phosgene and aqueous sodium hydroxide feeds, the reaction mixture was quenched with an aqueous disodium bisphenate solution prepared by mixing 119 grams of bisphenol A, 800 milliliters of water and 83.0 grams of 50 percent aqueous sodium hydroxide. Eighteen minutes after addition of the disodium bisphenate solution, the pH was 12.6. The milky organic layer was separated and washed with water to a pH of 11 followed by addition of 100 milliliters of 10 percent aqueous hydrochloric acid. Multiple water washes were completed followed by drying of the emulsion over silica gel and filtration through diatomaceous earth. The recovered organic solution was poured into a pan, solvent evaporated and drying under vacuum at 90° C. completed for two hours. The bisphenol A terminated polycarbonate oligomer product (312 grams) was recovered as a white powder. Weight average molecular weight was 6574, number average molecular weight was 3191, melting point was 242° C., glass transition temperature was 133° C. and phenolic hydroxyl group content was 1450 ppm.

B.

Preparation of Polycarbonate (1.31 percent by weight) Modified Epoxy Resin

A portion (300.8 grams) of a diglycidyl ether of bisphenol A having an epoxide equivalent weight (EEW) of 180.7 was added to a reactor and heated with stirring under a nitrogen atmosphere to 125° C. Once the 125° C. reaction temperature was achieved, a bisphenol A terminated polycarbonate oligomer prepared using the method of A above (4.00 grams, 1.31 percent by weight based on epoxy resin used) having an average molecular weight of 6400 was added. Heating of the reaction mixture was continued over a 31 minute period until a reaction temperature of 160° C. was achieved. After an additional 14 minutes at the 160° C. temperature, the polycarbonate was dissolved and bisphenol A (117.7 grams, 0.5156 mole) was added, then cooling commenced. After 12 minutes a reaction temperature of 104° C. was achieved, then ethyltriphenylphosphonium acetate.acetic acid complex (70 percent by weight solution in methanol) (0.23 gram) was added to the reactor and heating of the reactor contents resumed. After 93 minutes, a reaction temperature of 175° C. was achieved without a reaction exotherm due to the gradual heatup rate. After an additional 30 minutes at the 175° C. reaction temperature, the modified epoxy resin was recovered as a transparent solid with an EEW of 725.

EXAMPLE 2

Preparation of Polycarbonate (2.54 percent by weight) Modified Epoxy Resin

A portion (315 grams) of a diglycidyl ether of bisphenol A having an epoxide equivalent weight (EEW) of 180.7 was added to a reactor and heated with stirring under a nitrogen atmosphere to 160° C. Once the 160° C. reaction temperature was achieved, a portion of bisphenol A terminated polycarbonate oligomer prepared in Example 1-A (8.00 grams, 2.54 percent by weight based on epoxy resin used) was added. After an additional 23 minutes at the 160° C. temperature, the polycarbonate was dissolved and bisphenol A (123.3 grams, 0.5401 mole) was added, then cooling commenced. After 10 minutes a reaction temperature of 105° C. was achieved, then ethyltriphenylphosphonium acetate.acetic acid complex (70 percent by weight solution in methanol) (0.35 gram) was added to the reactor and heating of the reactor contents resumed. After 24 minutes a reaction temperature of 150° C. was achieved followed by an exotherm to 203° C. 9 minutes later. After an additional 22 minutes, a 175° C. reaction temperature was achieved. After 38 minutes at the 175° C. reaction temperature, the modified epoxy resin was recovered as a transparent solid with an EEW of 762.

EXAMPLE 3

Preparation of Polycarbonate (3.50 percent by weight) Modified Epoxy Resin

A portion (430.0 grams) of a diglycidyl ether of bisphenol A having an epoxide equivalent weight (EEW) of 180.7 was added to a reactor and heated with stirring under a nitrogen atmosphere to 165° C. Once the 165° C. reaction temperature was achieved, a portion of bisphenol A terminated polycarbonate oligomer prepared in Example 1-A (15.05 grams, 3.50 percent by weight based on epoxy resin used) was added. After an additional 27 minutes at the 165° C. temperature, the polycarbonate was dissolved and bisphenol A (168.2 grams, 0.7368 mole) was added, then cooling commenced. After 10 minutes a reaction temperature of 105° C. was achieved, then ethyltriphenylphosphonium acetate.acetic acid complex (70 percent by weight solution in methanol) (0.58 gram) was added to the reactor and heating of the reactor contents resumed. After 20 minutes a reaction temperature of 151° C. was achieved followed by an exotherm to 211° C. 7 minutes later. After an additional 14 minute, a 180° C. reaction temperature was achieved. After 46 minutes at the 180° C. reaction temperature, the modified epoxy resin was recovered as a transparent solid with an EEW of 808.

EXAMPLE 4

Preparation of Polycarbonate (4.94 percent by weight) Modified Epoxy Resin

A portion (395.0 grams) of a diglycidyl ether of bisphenol A having an epoxide equivalent weight (EEW) of 180.7 was added to a reactor and heated with stirring under a nitrogen atmosphere to 160° C. Once the 160° C. reaction temperature was achieved, a portion of bisphenol A terminated polycarbonate oligomer prepared in Example 1-A (19.5 grams, 4.94 percent by weight based on epoxy resin used) was added. After an additional 33 minutes at the 160° C. temperature, the polycarbonate was dissolved and bisphenol A (154.5 grams, 0.6767 mole) was added, then cooling commenced. After 15 minutes a reaction temperature of 114° C. was achieved, then ethyltriphenylphosphonium acetate.acetic acid complex (70 percent by weight solution in methanol) (0.54 gram) was added to the reactor and heating of the reactor contents resumed. After 17 minutes a reaction temperature of 150° C. was achieved followed by an exotherm to 214° C. 7 minutes later. After an additional 16 minutes, a 185° C. reaction temperature was achieved. After 45 minutes at the 185° C. reaction temperature, the modified epoxy resin was recovered as a transparent solid with an EEW of 832.

COMPARATIVE EXPERIMENT A

Preparation of Bisphenol A Advanced Epoxy Resin

A portion (300 grams) of a diglycidyl ether of bisphenol A having an epoxide equivalent weight (EEW) of 180.7 was added to a reactor and heated with stirring under a nitrogen atmosphere to 160° C. Once the 160° C. reaction temperature was achieved, bisphenol A (117.4 grams, 0.5142 mole) was added, then cooling commenced. After 15 minutes a reaction temperature of 107° C. was achieved, then ethyltriphenylphosphonium acetate.acetic acid complex (70 percent by weight solution in methanol) (0.41 gram) was added to the reactor and heating of the reactor contents resumed. After 21 minutes a reaction temperature of 150° C. was achieved followed by an exotherm to 201° C. 8 minutes later. After an additional 15 minutes, a 185° C. reaction temperature was achieved. After 46 minutes at the 185° C. reaction temperature, the modified epoxy resin was recovered as a transparent solid with an EEW of 687.

EXAMPLE 5

A.

Kinematic Viscosity Determination of Polycarbonate Modified Epoxy Resins

Kinematic viscosity measurements were determined for the resins of Examples 1-4 and standard resins of Comparative Experiments A-C utilizing Cannon-Fenske Routine Viscometers size 700. Viscosity measurements were taken at 175° C. and for several resins, at 200° C. An eleven gram sample of each solid resin was placed into a size 700 viscometer tube. The viscometer was then inserted into a 175° C. or 200° C. constant temperature oil bath. The viscometer was allowed to equilibrate at 175° C. or 200° C. for at least 60 minutes prior to viscosity measurement. The molten resin was free of all air bubbles prior to viscosity measurement. The kinematic viscosity values thus obtained are reported in Table I.

B.

Average Molecular Weight Determination for Polycarbonate Modified Epoxy Resins

Portions of the resins of Examples 1-4 and Comparative Experiments A-C were analyzed by gel permeation chromatography using polystyrene calibration standards and using a diglycidyl ether of bisphenol A advanced with bisphenol A to an epoxide equivalent weight of 530 as a calibration standard. The results are reported in Table II wherein the polydispersity ratios are the values of the ratio of weight average molecular weight to number average molecular weight.

C.

Softening Point Determination for Polycarbonate Modified Epoxy Resins

Portions of the resins of Examples 1-4 and Comparative Experiment A were analyzed for softening point using a Mettler FP83 Dropping Point Cell with FP80 Central Processor and standard methods (ASTM D3461). The results are reported in Table II.

TABLE I

| Ref. | Polycarbonate (weight percent)[1] | Epoxide Equivalent Weight | Viscosity (cps) 175° C. | Viscosity (cps) 200° C. |
|---|---|---|---|---|
| Ex. 1 | 1.31 | 725 | 1300 | — |
| Ex. 2 | 2.54 | 762 | 2400 | — |
| Ex. 3 | 3.50 | 808 | 4100 | 1500 |
| Ex. 4 | 4.94 | 832 | 7000 | 2500 |
| Comp. Expt. A | none | 687 | 1000 | — |
| Comp. Expt. B[2] | none | 894 | 1800 | — |
| Comp. Expt. C[3] | none | 1945 | >10,000 | 4600 |

[1] Based on epoxy resin reactant weight used.
[2] Bisphenol A diglycidyl ether advanced with bisphenol A (DER 664 - The Dow Chemical Company)
[3] Bisphenol A diglycidyl ether advanced with bisphenol A (DER 667 - The Dow Chemical Company)

TABLE II

| Ref. | Weight Average Molecular Weight (Polydispersity Ratio) polystyrene standard | Weight Average Molecular Weight (Polydispersity Ratio) epoxy resin standard | Softening Point (°C.) |
|---|---|---|---|
| Ex. 1 | 8142 (3.58) | 5481 (2.89) | 96.3 |
| Ex. 2 | 10,687 (4.30) | 6984 (3.38) | 101.0 |
| Ex. 3 | 11,200 (5.66) | 7731 (3.16) | 108.2 |
| Ex. 4 | 16,636 (8.33) | 10,418 (4.13) | 111.5 |
| Comp. Expt. A | 4823 (2.93) | 4091 (2.02) | 93.0 |
| Comp. Expt. B[2] | 6985 (3.03) | 4805 (2.51) | — |
| Comp. Expt. | 16,418 (3.64) | 10,454 (2.91) | — |

TABLE II-continued

| Ref. | Weight Average Molecular Weight (Polydispersity Ratio) | | Softening Point (°C.) |
|---|---|---|---|
| | polystyrene standard | epoxy resin standard | |
| C[3] | | | |

[2]Bisphenol A diglycidyl ether advanced with bisphenol A (DER 664 - The Dow Chemical Company)
[3]Bisphenol A diglycidyl ether advanced with bisphenol A (DER 667 - The Dow Chemical Company)

EXAMPLE 6

Preparation of Decorative Powder Coating Formulations

Portions of each of the epoxy resins from Examples 2–4 and Comparative Experiment A were ground in a Waring-type blender to a fine powder. Formulation weights, as per Table III, of the epoxy resin, dicyandiamide, a mixture of 17% 2-methylimidazole and 83% by weight dicyandiamide, Modaflow II, and filler, if used, were placed in a plastic bag, sealed and dry mixed to a homogeneous dry blend. The dry-mixed formulations were then extruded in a Buss-Condux PLK46 single screw extruder (equipped with a 46 mm diameter kneader screw operated at 120 rpm) with zone 1 at 60° C. and zone 2 at 100° C. The extrudate was passed through chilled rolls (6½ inch diameter rolls), cooled and crushed. The crushed extrudate was then fine ground in a Brinkman centrifugal grinding mill utilizing the 24-tooth grinding attachment. The finely ground extrudate was sieved thrugh No. 140 (150 mesh, 106 μm) standard test sieves (wire cloth). The −150 mesh powder coating formulations were applied via electrostatic spray with a Gema Ag Type 710 laboratory unit (set at 60–70 kV) on to 4 inch by 12 inch by 20 gauge (101.6 mm by 304.8 mm by 0.529 mm) cold rolled steel, clean treatment Parker test panels (Parker Division, Hooker Chemicals and Plastics Corporation). The electrostatically coated panels were set in a Blue M (General Signal) forced air oven and cured at 180° C. (356° F.) for twenty minutes. After removal from the oven the panels were cooled and evaluated via the following est methods: Coating thickness was determined per ASTM D1186 by utilizing a Fischer Perma-Scope ES film thickness tester. Surface gloss was determined per ASTM D523 (DIN 67530) using a Mallinckrodt Multi Gloss glossmeter. Gardner forward and reverse impact strengths were determined per ASTM D2794 using a Gardner "Coverall" Bend and Impact Tester, 46 inch (1.17 m) tube length, 0–160 in.-lb. tester, with a four pound (1.81 kg), one-half inch (12.7 mm) diameter cone. Visualization of any surface cracks at the impact sites was facilitated by application of an acidified copper sulfate ($CuSO_4$) solution for a period of 30 seconds. Impact areas were observed for copper deposits or iron-rust stains after exposure to the copper sulfate solution. A pad of cheese cloth made up of 8 plys was attached to the ball end of a 2 pound ball peen hammer. The cheese cloth end of the hammer was then saturated with methylethylketone. The pad end of the hammer was then drawn back and forth across the coated surface. Once back and forth movement was considered as one methylethylketone double rub. The procedure was repeated until the film failed by marring and the number of back and forth movements recorded.

Film thickness, surface gloss, Gardner impact strength values and methylethylketone double rubs of the cured powder coatings prepared using the epoxy resins of Examples 2–4 and the Comparative Experiment A are reported in Table IV.

COMPARATIVE EXPERIMENT D

Preparation of Bisphenol A Advanced Diglycidyl Ether of Bisphenol A and Bisphenol A Terminated Polycarbonate Blend A portion (500.0 grams) of a bisphenol A advanced diglycidyl ether of bisphenol A having an epoxide equivalent weight (EEW) of 714 (DER 662UH—The Dow Chemical Co.) and a portion (20.0 grams 4.00 percent by weight based on epoxy resin used) of bisphenol A terminated polycarbonate prepared in Example 1-A were formulated as per Table III using the method of Example 6. Decorative powder coated steel panels were prepared and tested using the method of Example 6. The results are given in Table IV.

TABLE III

| Des. of Epoxy Resin | Amount of Epoxy Resin | Curing Agent | | Modaflow II[3] (grams) | Filler type (grams) |
|---|---|---|---|---|---|
| | | A[1] (grams) | B[2] (grams) | | |
| Ex. 2 | 736 | 13.0 | 8.83 | 9.8 | BaSO₄ (208.5) |
| Ex. 3 | 500.3 | 8.0 | 6.0 | 6.6 | BaSO₄ (150.0) |
| Ex. 4 | 464.2 | 7.1 | 5.6 | 6.2 | BaSO₄ (139.2) |
| Comp. Expt. A | 368.0 | 7.58 | 4.42 | 4.9 | BaSO₄ (114.0) |
| Comp. Expt. D | 520.0[4] | 9.73 | 6.0 | 6.7 | BaSO₄ (150.0) |

[1]Curing Agent A was dicyandiamide.
[2]Curing Agent B was a mixture of 83 percent by weight dicyandiamide and 17 percent by weight 2-methylimidazole.
[3]A polyacrylate flow control agent (Monsanto).
[4]500.0 grams as bisphenol A advanced diglycidyl ether of bisphenol A, 20.0 grams as bisphenol A terminated polycarbonate.

TABLE IV

| Des. of Epoxy Resin | Film Thickness mils | Gloss degrees/ percent | Gardner Impact Strength Forward/Reverse in-lb/in-lb | Methylethylketone Double Rubs |
|---|---|---|---|---|
| Ex. 2 | 1.5–1.9 | 20/46.7 60/85.4 85/94.2 | 160/160 | >100 |
| Ex. 3 | 1.5–2.0 | 20/48.2 60/85.6 85/95.0 | 160/160 | >100 |
| Ex. 4 | 1.6–2.1 | 20/46.3 60/85.3 85/94.5 | 160/160 | >100 |
| Comp. Expt. A | 1.2–2.56 | 20/40.0 60/81.9 85/92.4 | 160/140 | 70 |
| Comp. Expt. D | 1.34–2.53 | 20/19.7 60/58.9 85/71.1 | 100/60 | — |

The coatings prepared from the epoxy resins of Examples 2–4 and Comparative Experiment A were smooth and free of flaws. The coating prepared from the epoxy resin and polycarbonate blend of Comparative Experiment D was grainy in appearance with a rough textured surface.

EXAMPLE 7

A.

Preparation of Bisphenol A Terminated Polycarbonate Oligomers

Bisphenol A (700.0 grams), methylene chloride (2500 grams), water (3650 grams), 50 percent aqueous sodium hydroxide (330 grams) and triethylamine (1.4 grams) were added to a reactor and rapidly stirred. A total of 300 grams of phosgene was fed into the reaction mixture over a 60 minute period with simultaneous addition of 50 percent aqueous sodium hydroxide at a rate so as to maintain a pH of 11.5. The organic layer was separated and washed with dilute hydrochloric acid followed by multiple water washes. The recovered organic solution was poured into a pan, solvent evaporated and drying under vacuum at 35° C. completed. The bisphenol A terminated (phenolic hydroxyl group terminated) polycarbonate oligomer product was recovered as a white powder. Weight average molecular weight was determined to be 6678, by gel permeation chromatography number average molecular weight was 2211 and phenol hydroxyl group content was 5541 ppm.

B.

Preparation of Polycarbonate (2.00 percent by weight) Modified Epoxy Resin

A portion (750 grams) of a diglycidyl ether of bisphenol A having an epoxide equivalent weight (EEW) of 182.8 was added to a reactor and heated with stirring under a nitrogen atmosphere to 165° C. Once the 165° C. reaction temperature was achieved, a portion of bisphenol A terminated polycarbonate oligomer (15.00 grams, 2.00 percent by weight based on epoxy resin used) from A above was added. The 165° C. temperature was maintained over a 6 minute period until all the polycarbonate was dissolved. After an additional 9 minutes, bisphenol A (334.12 grams, 1.464 mole) was added, then cooling commenced. After 20 minutes a reaction temperature of 100° C. was achieved, then ethyltriphenylphosphonium acetate.acetic acid complex (70 percent by weight solution in methanol) (1.08 gram) was added to the reactor and heating of the reactor contents resumed. After 14 minutes, a temperature of 150° C. was achieved and heating ceased. After an additional 4 minutes, a maximum exotherm of 222° C. occurred followed by cooling to 190° C. over a 5 minute period. After 23 minutes, the 150° temperature was reachieved then a polyacrylate flow modifier (Liquid Modaflow, Monsanto) (5.42 grams, 0.50 percent by weight) was added to the reactor. Four minutes later, the nitrogen purge outlet was replaced with a vacuum inlet, the condensor outlet was sealed and vacuum stripping of the reactor commenced. A full vacuum (20 mm Hg) was achieved 11 minutes later and was maintained for an additional 19 minutes after which time the reactor was returned to its original configuration. The modified epoxy resin was recovered as an opaque, white colored solid with an EEW of 908.4.

EXAMPLE 8

Preparation of Polycarbonate (3.50 percent by weight) Modified Epoxy Resin

A portion (750 grams) of a diglycidyl ether of bisphenol A having an epoxide equivalent weight (EEW) of 182.8 was added to a reactor and heated with stirring under a nitrogen atmosphere to 165° C. Once the 165° C. reaction temperature was achieved, a portion of bisphenol A terminated polycarbonate (26.25 grams, 3.50 percent by weight based on epoxy resin used) from Example 7-A was added. The 165° C. temperature was maintained over a 7 minute period until all the polycarbonate was dissolved. After an additional 8 minutes, bisphenol A (334.12 grams, 1.464 moles) was added, then cooling commenced. After 19 minutes a reaction temperature of 100° C. was achieved, then ethyltriphenylphosphonium acetate.acetic acid complex (70 percent by weight solution in methanol) (1.08 grams) was added to the reactor and heating of the reactor contents resumed. After 9 minutes, a temperature of 150° C. was achieved and heating ceased. After an additional 10 minutes a maximum exotherm of 228° C. occurred followed by cooling to 190° C. over a 6 minute period. After 25 minutes, the 150° C. temperature was reachieved then a polyacrylate flow modifier (liquid Modaflow, Monsanto) (5.42 grams, 0.50 percent by weight) was added to the reactor. Five minutes later, the nitrogen purge outlet was replaced with a vacuum inlet, the condensor outlet was sealed and vacuum stripping of the reactor commenced. A full vacuum (10 mm Hg) was achieved 16 minutes later and was maintained for an additional 14 minutes after which time the reactor was returned to its original configuration. The modified epoxy resin was recovered as an opaque, white colored solid with an EEW of 975.6.

EXAMPLE 9

Preparation of Polycarbonate (5.00 percent by weight) Modified Epoxy Resin

A portion (900 grams) of a diglycidyl ether of bisphenol A having an epoxide equivalent weight (EEW) of 182.8 was added to a reactor and heated with stirring under a nitrogen atmosphere to 165° C. Once the 165° C. reaction temperature was achieved, a portion of bisphenol A terminated polycarbonate (45.0 grams, 5.00 percent by weight based on epoxy resin used) from Example 7-A was added. The 165° C. temperature was maintained over a 7 minute period until all the polycarbonate was dissolved. After an additional 8 minutes, bisphenol A (400.94 grams, 1.756 moles) was added, then cooling commenced. After 13 minutes a reaction temperature of 100° C. was achieved, then ethyltriphenylphosphonium acetate.acetic acid complex (70 percent by weight solution in methanol) (1.30 grams) was added to the reactor and heating of the reactor contents resumed. After 12 minutes, a temperature of 150° C. was achieved and heating ceased. After an additional 5 minutes a maximum exotherm of 216° C. occurred followed by cooling to 190° C. over a 7 minutes period. After 22 minutes, the 150° C. temperature was reachieved then a polyacrylate flow modifier (Liquid Modaflow, Monsanto) (6.51 grams, 0.50 percent by weight) was added to the reactor. Five minutes later, the nitrogen purge outlet was replaced with a vacuum inlet, the condenser outlet was sealed and vacuum stripping of the reactor commenced. A full vacuum (13 mm Hg) was achieved 14 minutes later and was maintained for an additional 16 minutes after which time the reactor was returned to its original configuration. The modified epoxy resin was recovered as an opaque, white colored solid with an EEW of 1075.3.

COMPARATIVE EXPERIMENT E

Preparation of Bisphenol A Advanced Epoxy Resin

A portion (750 grams) of a diglycidyl ether of bisphenol A having an epoxide equivalent weight (EEW) of 182.8 was added to a reactor and heated with stirring under a nitrogen atmosphere to 165° C. Once the 165° C. reaction temperature was achieved, bisphenol A (334.12 grams, 1.464 moles) was added, then cooling commenced. After 18 minutes a reaction temperature of 100° C. was achieved, then ethyltriphenylphosphonium acetate.acetic acid complex (70 percent by weight solution in methanol) (1.08 grams) was added to the reactor and heating of the reactor contents resumed. After 13 minutes, a temperature of 150° C. was achieved and heating ceased. After an additional 7 minutes a maximum exotherm of 203° C. occurred followed by cooling to 190° C. over a 2 minute period. After 26 minutes, the 150° C. temperature was reachieved then a polyacrylate flow modifier (Liquid Modaflow, Monsanto) (5.42 grams, 0.50 percent by weight) was added to the reactor. Five minutes later, the nitrogen purge outlet was replaced with a vacuum inlet, the condenser outlet was sealed and vacuum stripping of the reactor commenced. A full vacuum (15 mm Hg) was achieved 13 minutes later and was maintained for an additional 17 minutes after which time the reactor was returned to its original configuration. The epoxy resin was recovered as an opaque, white colored solid with an EEW of 903.4.

EXAMPLE 10

Preparation of Functional Powder Coating Formulations and Low Temperature Bend Testing Portions of each of the epoxy resins from Examples 7, 8, 9 and Comparative Experiment E were crushed to a coarse powder. Formulation weights, as per Tables V and VI, of the epoxy resin, an accelerated dicyandiamide curing agent (Shell P-104), red iron oxide (Pfizer 3098) and 400 mesh wollastonite (CaSiO$_3$) were placed in a plastic bag, sealed and dry mixed to a homogeneous dry blend. The dry-mixed formulations were then extruded in a Buss Condux PLK46 single screw extruder (equipped with a 46 mm diameter kneader screw operated at 120 rpm) with zone 1 at 50° C. and zone 2 at 90° C. The extrudate was passed through chill rolls (BLI) (6½ inch diameter), cooled and crushed. The crushed extrudate was then fine ground in a Brinkmann centrifugal grinding mill utilizing the 12-tooth grinding attachment with 0.75 mm screen. Approximately 1000 grams of the fine ground extrudate was weighed into a fluidized bed apparatus. Air flow was initiated through the fluidized bed and adjusted to establish a homogeneous fluidized suspension of fine ground extrudate. A series of twelve ⅜ inch by 1 inch by 8 inch steel bars (2 mil anchor pattern) per powder coating formulation were suspended and preheated in an oven maintained at 232° C. (450° F.) for at least 30 minutes but no longer than 90 minutes prior to use. Each preheated bar was removed via its hanger and twice dipped into the fluidized bed to provide an optimum coating thickness of 12 to 16 mils. Each dipped bar was then held for three minutes of post cure time followed by immersion in cold flowing tap water for 1.5 minutes. Following cooling, each coated bar was measured for film thickness and visually inspected for flaws. Any bars outside the desired 12 to 16 mil coating thickness or possessing observable flaws were discarded.

The coated bars were placed in a temperature controlled box and equilibrated at 0° F.±2° F. for a period of 2 hours. The chilled bars were tested for low temperature bending strength by placing each bar in a Bell bender apparatus. The bar was centered so that it was supported 1.5 inches from each end then force was applied smoothly and continuously through a 2 inch span directly centered in the bar until failure occurred. Failure occurred when the first visually observable stretch mark or crack in the coated surface appeared. The angle of the bend to failure was measured for each bar tested. This value, plus the coating thickness were used in the following formula to provide the degree bend per pipe diameter length values reported in Table VI:

$$\text{degree bend per pipe diameter length} = \frac{\text{bend angle} \times \text{coated bar thickness}}{2 \text{ inch span}}$$

TABLE V

| Des. of Epoxy Resin | Amount of Epoxy Resin (grams) | Curing Agent (grams) | Iron oxide (grams) | CaSiO$_3$ (grams) |
|---|---|---|---|---|
| Ex. 7 | 940.0 | 28.73 | 28.20 | 319.60 |
| Ex. 8 | 843.9 | 23.99 | 25.32 | 286.93 |
| Ex. 9 | 1100.0 | 28.39 | 33.0 | 374.00 |
| Comp. Expt. E | 945.0 | 29.03 | 28.35 | 321.30 |

TABLE VI

| Des. of Epoxy Resin | Average Bend Angle (degrees) | Average Coated Bar Thickness (inch) | Average Degree Bend per Pipe Diameter Length (range) |
|---|---|---|---|
| Ex. 7 | 44.6 | 0.406 | 9.05 (7.64–10.50) |
| Ex. 8 | 47.8 | 0.406 | 9.72 (8.38–11.95) |
| Ex. 9 | 42.5 | 0.408 | 8.67 (8.26–9.23) |
| Comp. Expt. E | 45.8 | 0.405 | 9.28 (7.74–11.60) |

EXAMPLE 11

Water Resistance and Adhesion of Functional Powder Coatings

A series of ten 3/16 inch by 3 inch by 8 inch steel bars (2 mil anchor pattern) per powder coating formulation prepared in Example 10 were coated in the fluidized bed using the method of Example 10. A single coated panel from each of the resin formulations was evaluated as an unexposed control for adhesion by scoring an "X" into the face of each panel centered ¼ inch from either edge. Each score line comprising the "X" was 4 inches long and intersected at the two inch length of each line. All scoring was done with a sharp razor blade knife. Adhesion was evaluated by picking and prying the coating in the top triangle region and starting at the apex formed by the "X" score using the razor blade knife held at an angle of about 45° with respect to the coated surface. A period of 60 seconds was allowed for attempting to pick and pry off the coating. The amount of coating removed to expose bare metal was measured and the amount of this coating loss as a percentage of the total area subtended by the triangle was calculated.

A pair of coated bars prepared from each of the resin formulations were suspended in a 3 liter glass resin kettle fitted with a reflux condensor and filled with deionized water maintained at 90° C.±0.5° C. The water level was maintained such that each of the panels were totally and continuously immersed. Care was taken to insure that the panels were separated from each other during the entire exposure by using rubber spacers. A single coated bar from each of the respective resin formulations was removed from the resin kettle after 24 hours of exposure to the 90° C. deionized water, blotted dry, scored with an "X" and then tested for adhesion in the top triangular area subtended by the score lines within 15 seconds of removal. The adhesion was then tested in the bottom triangular area one hour after removal. The amount of coating removed to expose bare metal was quantified for both test regions of each of the respective coated bars as previously described. Visual observation of coating appearance was also made one each coated bar. The results are reported in Table VII.

The final set of coated bars were removed after 7 days of exposure to the 90° C. deionized water and tested as per the 24 hour exposed coated bars. The results are reported in Table VIII.

EXAMPLE 12

Preparation of Polycarbonate (2.50 percent by weight) Modified Epoxy Resin Using p-t-Butylphenol Capped, Higher Molecular Weight Polycarbonate A portion (900.0 grams) of a diglycidyl ether of bisphenol A having an epoxide equivalent weight (EEW) of 181.09 was added to a reactor and heated with stirring under a nitrogen atmosphere to 165° C. Once the 165° C. reaction temperature was achieved, a portion of a p-t-butylphenol terminated bisphenol A polycarbonate (22.5 grams, 2.50 percent by weight based on epoxy resin used) was added. The polycarbonate used was a commercial grade product with a weight average molecular weight of 16,000 and a polydispersity ratio of 2.253. The 165° C. temperature was maintained over a 2 minute period until all the polycarbonate was dissolved. After an additional 13 minutes, bisphenol A (405.7 grams, 1.777 moles) was added, then cooling commenced. After 20 minutes a reaction temperature of 100° C. was achieved, then ethyltriphenylphosphonium acetate.acetic acid complex (70 percent by weight solution in methanol) (1.31 grams) was added to the reactor and heating of the reactor contents resumed. After 14 minutes, a temperature of 150° C. was achieved and heating ceased. After an additional two minutes, a tem-

TABLE VII

| | Designation of Resin Used in Formulation | | | | |
| --- | --- | --- | --- | --- | --- |
| | Example 7 | Example 8 | Example 9 | Comparative Experiment E | Comparative Experiment F[1] |
| Unexposed | | | | | |
| Coating Area Lost (%) | 0 | 0 | 0 | 0 | 0 |
| 24 Hours of Exposure | | | | | |
| Average Film Thickness (mil) | 14.965 | 14.60 | 14.607 | 14.96 | 14.43 |
| Standard Deviation | ±1.144 | ±1.558 | ±1.296 | ±1.394 | ±1.271 |
| Range (mil) | 12.78–16.7 | 11.3–16.3 | 12.25–16.6 | 11.6–16.7 | 12.5–16.4 |
| Coating Area Lost (%) | | | | | |
| ≦15 second recovery | 100 | 39.2 | 17.5 | 100 | 100 |
| 1 hour recovery | 27.0 | 9.5 | 8.3 | 100 | 100 |
| Visual Observations | (2) | (2) | (2) | (3) | (3) |

[1]Bisphenol A diglycidyl ether advanced with bisphenol A to 1011 EEW (DER 664U - The Dow Chemical Company) - 1200.0 grams, curing agent (Shell P-104) - 32.94 grams, iron oxide - 36.0 grams, $CaSiO_3$ - 408.0 grams, polyacrylate flow modifier (Monsanto Modaflow II) - 6.0 grams were used in the formulation. Coatings were prepared as per the method of Example 10.
[2]Coating picked off in small pieces.
[3]Coating peels off as single intact sheet.

TABLE VIII

| | Designation of Resin Used in Formulation | | | | |
| --- | --- | --- | --- | --- | --- |
| | Example 7 | Example 8 | Example 9 | Comparative Experiment E | Comparative Experiment F[1] |
| One Week of Exposure | | | | | |
| Average Film Thickness (mil) | 14.72 | 13.94 | 13.977 | 14.51 | 14.42 |
| Standard Deviation | ±1.311 | ±1.341 | ±1.135 | ±1.545 | ±1.374 |
| Range (mil) | 12.5–16.5 | 11.45–15.8 | 11.99–15.46 | 11.8–16.6 | 11.88–16.59 |
| Coating Area Lost (%) | | | | | |
| ≦15 second recovery | 100 | 100 | 36.0 | 100 | 100 |
| 1 hour recovery | 100 | 100 | 8.8 | 100 | 100 |
| Visual Observations | (2) | (2) | (2) | (3) | (3) |

[1]Bisphenol A diglycidyl ether advanced with bisphenol A to 1011 EEW (DER 664U - The Dow Chemical Company) - 1200.0 grams, curing agent (Shell P-104) - 32.94 grams, iron oxide - 36.0 grams, $CaSiO_3$ - 408.0 grams, polyacrylate flow modifier (Monsanto Modaflow II) - 6.0 grams were used in the formulation. Coatings were prepared as per the method of Example 10.
[2]Coating picked off in small pieces.
[3]Coating peels off as single intact sheet.

perature of 170° C. was achieved and air cooling of the reactor exterior was started. After an additional 3 minutes, a maximum exotherm of 202° C. occurred followed by cooling to 190° C. over a 3 minute period. After 35 minutes, the reaction temperature reached 155° C. and the nitrogen purge outlet was replaced with a vacuum inlet, the condensor outlet was sealed and vacuum stripping of the reactor commenced. A full vacuum (7 mm Hg) was achieved 19 minutes later and was maintained for an additional 11 minutes after which time the reactor was returned to its original configuration. Heating to 180° C. was completed over a 15 minute period then the modified epoxy resin was recovered as a light yellow colored, transparent solid with an EEW of 1059.0.

EXAMPLE 13

Preparation of Polycarbonate (4.00 percent by weight) Modified Epoxy Resin Using p-t-Butylphenol Capped, Higher Molecular Weight Polycarbonate A polycarbonate modified epoxy resin was prepared using the method of Example 12 with an increased amount of p-t-butylphenol terminated bisphenol A polycarbonate (36.0 grams, 4.00 percent by weight based on epoxy resin used) and a reaction temperature of 165° C. just prior to and during the vacuum stripping step. The modified epoxy resin was heated to 200° C. then recovered as a light yellow colored, transparent solid with an EEW of 1166.0.

EXAMPLE 14

Preparation of Polycarbonate (5.00 percent by weight) Modified Epoxy Resin Using p-t-Butylphenol Capped, Higher Molecular Weight Polycarbonate A polycarbonate modified epoxy resin was prepared using the method of Example 12 with an increased amount of p-t-butylphenol terminated bisphenol A polycarbonate (45.0 grams, 5.00 percent by weight based on epoxy resin used). Reaction temperature was allowed to drop to 175° C. after the maximum exotherm and was increased to 200° C. just prior to the vacuum stripping step. The modified epoxy resin was maintained at 200° C. then recovered as an opaque, white colored solid with an EEW of 1209.0.

COMPARATIVE EXPERIMENT G

Preparation of Bisphenol A Advanced Epoxy Resin

A portion (900.0 grams) of a diglycidyl ether of bisphenol A having an epoxide equivalent weight (EEW) of 182.8 was added to a reactor and heated with stirring under a nitrogen atmosphere to 165° C. Once the 165° C. reaction temperature was achieved, bisphenol A (405.7 grams, 1.777 moles) was added, then cooling commenced. After 18 minutes a reaction temperature of 100° C. was achieved, then ethyltriphenylphosphonium acetate.acetic acid complex (70 percent by weight solution in methanol) (1.31 grams) was added to the reactor and heating of the reactor contents resumed. After 11 minutes, a temperature of 150° C. was achieved and heating ceased. After an additional 3 minutes, a temperature of 170° C. was achieved and air cooling of the reactor exterior was started. After an additional 4 minutes, a maximum exotherm of 194° C. occurred followed by cooling to 190° C. over a 4 minute period. After 30 minutes, the reaction temperature reached 155° C. and the nitrogen purge outlet was replaced with a vacuum inlet, the condensor outlet was sealed and vacuum stripping of the reactor commenced. A full vacuum (6 mm Hg) was achieved 11 minutes later and was maintained for an additional 19 minutes after which time the reactor was returned to its original configuration. Heating to 180° C. was completed over a 7 minute period then the epoxy resin was recovered as a light yellow colored, transparent solid with an EEW of 924.5.

EXAMPLE 15

Average Molecular Weight Determination for Polycarbonate Modified Epoxy Resins

Portions of the resins of Examples 12-14 and Comparative Experiment G were analyzed by gel permeation chromatography using polystyrene calibration standards and using a diglycidyl ether of bisphenol A advanced with bisphenol A to an epoxide equivalent weight of 530 as a calibration standard. The results are reported in Table IX wherein the polydispersity ratios are the value of the ratio of weight average molecular weight to number average molecular weight.

TABLE IX

| Ref. | Epoxide Equivalent Weight | Weight Average Molecular Weight (Polydispersity Ratio) | |
|---|---|---|---|
| | | polystyrene standard | epoxy resin standard |
| Example 12 | 1059.0 | 11,189 (4.40) | 6,575 (3.91) |
| Example 13 | 1166.0 | 22,348 (7.67) | 12,608 (6.54) |
| Example 14 | 1209.0 | 96,329 (39.74) | 49,419 (30.16) |
| Comp. Expt. G | 924.5 | 5,498 (2.83) | 3,355 (2.60) |

EXAMPLE 16

Water Resistance and Adhesion of Functional Powder Coatings

Portions of each of the epoxy resin from Examples 12, 13 and Comparative Experiment G were crushed to a coarse powder and formulated using the method of Example 10 as shown in Table X. A series of ten 3/16 inch by 3 inch by 8 inch steel bars per each powder coating formulation were prepared using the method of Example 11. A single coated panel from each of the resin formulations was evaluated as an unexposed control for adhesion using the method of Example 11. A single coated panel from each of the resin formulations was exposed to 90° C.±0.5° C. deionized water for 7 days then evaluated for adhesion using the method of Example 11. The results are reported in Table XI.

TABLE X

| Des. of Epoxy Resin | Amount of Epoxy Resin (grams) | Curing Agent[1] (grams) | Iron Oxide (grams) | CaSiO$_3$ (grams) | Flow Control Agent[2] (grams) | Benzoin (grams) |
|---|---|---|---|---|---|---|
| Ex. 12 | 1200.0 | 31.44 | 36.00 | 408.0 | 10.05 | 11.73 |
| Ex. 13 | 1200.0 | 28.56 | 36.00 | 408.0 | 10.04 | 11.71 |

TABLE X-continued

| Des. of Epoxy Resin | Amount of Epoxy Resin (grams) | Curing Agent[1] (grams) | Iron Oxide (grams) | CaSiO₃ (grams) | Flow Control Agent[2] (grams) | Benzoin (grams) |
|---|---|---|---|---|---|---|
| Comp. Expt. G | 1150.0 | 34.50 | 34.50 | 391.0 | 9.66 | 11.27 |

[1] Accelerated dicyandiamide curing agent (Shell P-104)
[2] Acrylate copolymer flow control agent containing silica (Acrylon MFP, Synthron, Inc.)

TABLE XI

| | Designation of Resin Used in Formulation | | |
|---|---|---|---|
| | Example 12 | Example 13 | Comparative Experiment G |
| Unexposed | | | |
| Coating Area Lost (%) | 0 | 0 | 0 |
| One Week of Exposure | | | |
| Average Film Thickness (mil) | 13.4 | 13.75 | 14.2 |
| Standard Deviation | ±1.222 | ±1.024 | ±1.157 |
| Range (mil) | 11.4–16.0 | 11.8–15.7 | 12.1–15.8 |
| Coating Area Lost (%) | | | |
| ≦15 second recovery | 3.22 | 0.78 | 100 |
| 1 hour recovery | 0.14 | 2.69[1] | 100 |
| Visual Observations | (2) | (2) | (3) |

[1] Increased coating loss after 1 hour recovery appeared to be due to slight flaw area in coating.
[2] Coating picked off in small pieces.
[3] Coating peels off as single intact sheet.

EXAMPLE 17

Preparation of Phenolic Cured Functional Powder Coating and Low Temperature Bend Testing A polycarbonate modified epoxy resin was prepared using the method of Example 13. The modified epoxy resin was recovered as a light yellow colored, transparent solid with an EEW of 1125.8. A portion (1200.0 grams) of the epoxy resin, an accelerated bisphenol A capped epoxy resin (phenolic curing agent, Dow DEH 84) having a hydroxyl equivalent weight of 255 (271.81 grams), red iron oxide (Pfizer 3098) (36.0 grams), 400 mesh wollastonite (CaSiO₃) (408.0 grams), benzoin (13.41 grams) and an acrylate copolymer flow control agent containing silica (Acrylon MFP, Synthron, Inc.) (9.58 grams) were formulated and used to prepare a series of six ⅜ inch by 1 inch by 8 inch coated steel bars using the method of Example 10. The bars were tested for low temperature bending strength using the method of Example 10. The results are reported in Table XII.

TABLE XII

| Average Bend Angle (degrees) | 44.5 |
|---|---|
| Average Coated Bar Thickness (inch) | 0.4097 |
| Average Degree Bend per Pipe Diameter Length (range) | 9.12 (8.51–9.53) |

EXAMPLE 18

Preparation of Polycarbonate (4.00 percent by weight) Modified Epoxy Resin Using p-t-Butylphenol Capped Higher Molecular Weight Polycarbonate and 2-Ethyl-1-hexanol A portion (900.0 grams) of a diglycidyl ether of bisphenol A having an epoxide equivalent weight (EEW) of 181.09 was added to a reactor and heated with stirring under a nitrogen atmosphere to 100° C. Once the 100° C. reaction temperature was achieved, a portion of p-t-butylphenol terminated bisphenol A polycarbonate (36.0 grams, 4.00 percent by weight based on epoxy resin used) and 2-ethyl-1-hexanol (1.84 grams) were added. The polycarbonate used is described in Example 12. The 100° C. reaction temperature was maintained for a 34 minute period, then heating to 165° C. commenced and this temperature was achieved 16 minutes later. At this time, bisphenol A (405.7 grams, 1.777 moles) was added, then cooling commenced. After 8 minutes a reaction temperature of 100° C. was achieved, then ethyltriphenylphosphonium acetate.acetic acid complex (70 percent by weight solution in methanol) (1.31 grams was added to the reactor and heating of the reactor contents resumed. After 15 minutes, a temperature of 150° C. was achieved and heating ceased. After an additional 3 minutes, a temperature of 170° C. was achieved and air cooling of the reactor exterior was started. After an additional 5 minutes, a maximum exotherm of 200° C. occurred followed by cooling to 175° C. over a 3 minute period. After 18 minutes at the 175° C. reaction temperature, the nitrogen purge outlet was replaced with a vacuum inlet, the condensor outlet was sealed and vacuum stripping of the reactor commenced. A full vacuum (15 mm Hg) was achieved during the 30 minute vacuum stripping after which time the reactor was returned to its original configuration. Heating to 200° C. was completed over a 15 minute period then the modified epoxy resin was recovered as a light yellow colored, transparent solid with an EEW of 1090.7.

A duplicate of the above reaction was completed without the use of the 2-ethyl-1-hexanol reactant. The modified epoxy resin was recovered as a light yellow colored, transparent solid with an EEW of 1125.8.

Gel permeation chromatographic analysis of both resins was completed using the method of Example 15. The results are reported in Table XIII wherein the polydispersity ratios are the value of the ratio of weight average molecular weight to number average molecular weight.

TABLE XIII

| | | Weight Average Molecular Weight (Polydispersity Ratio) | |
|---|---|---|---|
| Reference | Epoxide Equivalent Weight | polystyrene standard | epoxy resin standard |
| Polycarbonate Modified Epoxy Resin Using 2-ethyl-1-hexanol | 1090.7 | 15,553 (6.23) | 8701 (5.30) |
| Polycarbonate Modified Epoxy Resin | 1125.8 | 19,317 (7.09) | 10,667 (5.96) |

EXAMPLE 19

Cathodic Disbondment of Functional Powder Coatings

Unused pairs of coated test panels prepared in Example 11 using the formulated resins of Examples 7, 8, 9 and Comparative Experiments E and F were evaluated for cathodic disbondment as per the method of ASTM G8-85. Each test panel was predrilled and tapped to provide a 5/16 inch threaded hole at a location 12 mm on center from the bottom three inch edge and 38 mm on center from the eight inch edge. A 46 mm diameter circular area was marked on each panel and the average film thickness within this area was measured. A ⅛ inch holiday was drilled in the center of each marked circular area. A seven inch tall plexiglass tube 46 mm in diameter was attached to each marked circular area using a silicone rubber adhesive (Dow Corning Silastic ® RTV) to insure a water tight seal. After allowing the silicone rubber to cure overnight at room temperature, each plexiglass tube was filled to a depth of 6 inches using a 3% sodium chloride solution in deionized water. The silastic seal on each test panel was then observed for leakage of the aqueous salt solution. All the test panels were set up in parallel series on a table top equipped with a row of insulated copper wire connectors and platinum wire electrodes which were held by individual alligator clamps. This system was supplied with a regulated 6 volt power supply. A brass screw, two brass washers and one brass nut were attached to each panel at the threaded hole. The insulated copper wire connector was then attached to the respective panel via the brass screw assembly. A platinum wire electrode was dipped below the surface of each respective aqueous sodium chloride solution to a depth of approximately ½ inch. A three inch diameter watch glass was then used to cover each plexiglass tube and secure the position of the platinum electrode. Once all test panels were connected, the system was energized with 6 volts and a steady stream of gas bubbles was immediately observed to emanate from the predrilled holiday and through the salt solution. The test was maintained for 30 days at room temperature (25° C.) with back addition of aqueous sodium chloride solution as needed to maintain the proper level in the plexiglass tubes. After 30 days of exposure, the electrical system was de-energized and each test panel was disconnected from the insulated copper wiring. After removal of the aqueous sodium chloride solution and plexiglass tube, the surface of each panel was rinsed with water and dried. Testing of each predrilled holiday site was immediately initiated by picking and prying the coating from all directions around the holiday using a razor blade knife held at an angle of about 45 with respect to the coated surface. A period of 60 seconds was allowed for attempting to pick and pry off the coating. The diameter of the coating removed (including the diameter of the predrilled holiday) to expose bare metal was measured and is reported in Tables XIV and XV. Visual appearance of all the samples in the test area revealed a minor amount of surface whitening. Slight scratching on the whitened surface revealed the original panel color and surface appearance.

TABLE XIV

| | Designation of Resin Used in Formulation | | | | | |
|---|---|---|---|---|---|---|
| | Example 7 (Panel No.) | | Example 8 (Panel No.) | | Example 9 (Panel No.) | |
| | 1 | 2 | 1 | 2 | 1 | 2 |
| Average Film Thickness (mil) at exposed circular area | 15.289 | 16.28 | 15.486 | 16.179 | 12.96 | 13.41 |
| Standard Deviation | ±.2734 | ±.805 | ±.6898 | ±.5268 | ±.575 | ±.585 |
| Range (mil) | 14.89–15.84 | 15.3–17.7 | 14.2–16.79 | 15.41–17.3 | 12.3–14.2 | 12.0–14.1 |
| Diameter (mm) of area lost (includes holiday) | No disbondment | No disbondment | No disbondment | No disbondment | No disbondment | No disbondment |

TABLE XV

| | Designation of Resin Used in Formulation | | | |
|---|---|---|---|---|
| | Comp. Expt. E (Panel No.) | | Comp. Expt. F (Panel No.) | |
| | 1 | 2 | 1 | 2 |
| Average Film Thickness (mil) at exposed circular area | 14.78 | 17.03 | 16.04 | 14.73 |
| Standard Deviation | ±.387 | ±.629 | ±.491 | ±.202 |
| Range (mil) | 14.28–15.21 | 15.89–17.93 | 15.29–16.82 | 14.5–15.08 |
| Diameter (mm) of area lost (includes holiday) | 8.74 | 9.27 | 13.01 | 14 |

EXAMPLE 20

Differential Scanning Calorimetry of Cured Functional Powder Coatings

Portions (15 milligrams) of the powder coating formulations prepared in Example 16 using the resins of Examples 12, Example 13 and Comparative Experiment G were cured for 3 minutes at 232° C. then analyzed by differential scanning calorimetry at a temperature range of 30° to 225° C. using a rate of heat increase by 10° C. per minute under a nitrogen atmosphere flowing at 30 cc per minute. The results are given in Table XVI.

TABLE XVI

| Designation of Resin Used in Formulation | Midpoint Glass Transition Temperature (°C.) |
|---|---|
| Example 12 | 99.8 |
| Example 13 | 101.3 |
| Comp. Expt. G | 98.4 |

EXAMPLE 21

Preparation of Polycarbonate (4.00 percent by weight) Modified Epoxy Resin Without Subsequent Advancement Reaction A portion (750.0 grams) of a diglycidyl ether of bisphenol A having an epoxide equivalent weight (EEW) of 180.4 was added to a reactor and heated with stirring under a nitrogen atmosphere to 165° C. Once the 165° C. reaction temperature was achieved, a portion of p-t-butylphenol terminated bisphenol A polycarbonate (30.0 grams, 4.00 percent by weight based on epoxy resin used) was added. The polycarbonate used is described in Example 12. After 15 minutes at the 165° C. temperature, the reactor was cooled to 100° C. over a 9 minute period. Once the 100° C. temperature was achieved, ethyltriphenylphosphonium acetate.acetic acid complex (70 percent by weight in methanol) (1.09 grams) was added to the reactor and heating of the reactor contents resumed. After 28 minutes, a temperature of 190° C. was achieved and heating ceased. The reactor contents cooled to 165° C. over a 16-minute period and this temperature was held for 44 minutes. The modified epoxy resin was recovered as a light yellow colored, transparent, viscous liquid with an EEW of 194.8.

Gel permeation chromatographic analysis of both the diglycidyl ether of bisphenol A starting reactant and the modified epoxy resin product was completed using the method of Example 15. The results are reported in Table XVII wherein the polydispersity ratios are the value of the ratio of weight average molecular weight to number average molecular weight.

TABLE XVII

| Reference | Epoxide Equivalent Weight | Weight Average Molecular Weight (Polydispersity Ratio) | |
|---|---|---|---|
| | | polystyrene standard | epoxy resin standard |
| Diglycidyl Ether of Bisphenol A Starting | 180.4 | 485.4 (1.12) | 333.1 (1.11) |
| Reactant Polycarbonate Modified Epoxy Resin | 194.8 | 885.1 (1.72) | 593.8 (1.67) |

The diglydicyl ether of bisphenol A starting reactant provided a single normally distributed peak in the gel permeation chromatograms (with minor shouldering). The polycarbonate modified epoxy resin provided a bimodal distribution in the gel permeation chromatograms.

The product of Example 21 is useful for the preparation of the advanced polycarbonate modified epoxy resins such as are taught by the foregoing examples.

We claim:

1. An epoxy resin composition consisting essentially of the reaction product of
   (1) one or more epoxy resins with
   (2) from about 0.1 to 10.0% by weight based on the total weight of the product of an aromatic polycarbonate resin or oligomer
   whereby said epoxy resin is linked by one of more carbonate bonds to the transesterification induced chain scission products of said polycarbonate to provide chain branching and/or crosslinking of said epoxy resin.

2. The composition of claim 1 which has reacted into said composition
   (A) from about 0.1 to about 0.99 hydroxyl equivalents of a polyphenol per epoxide equivalents in said epoxy resin, or
   (B) from about 1.0 to about 250% by weight of one or more monoalcohols, monophenols or a mixture thereof based on the weight of polycarbonate used, or
   (C) a mixture of (A) and (B).

3. The composition of claim 1 wherein the epoxy resin has the structure set forth in one of the formulas I-V

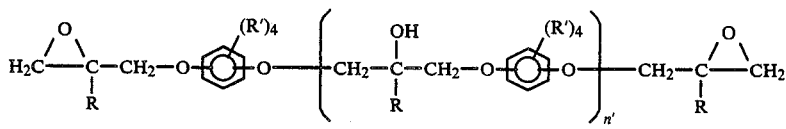

FORMULA I

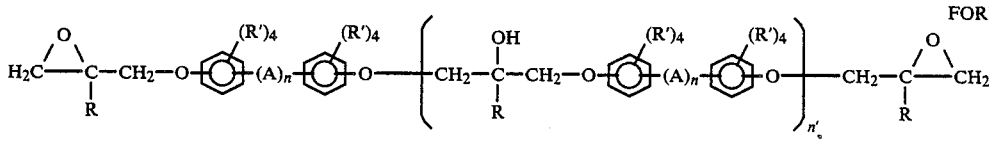

FORMULA II

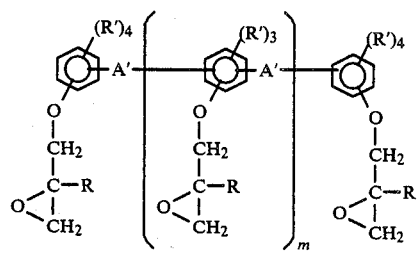

FORMULA III

-continued

FORMULA IV

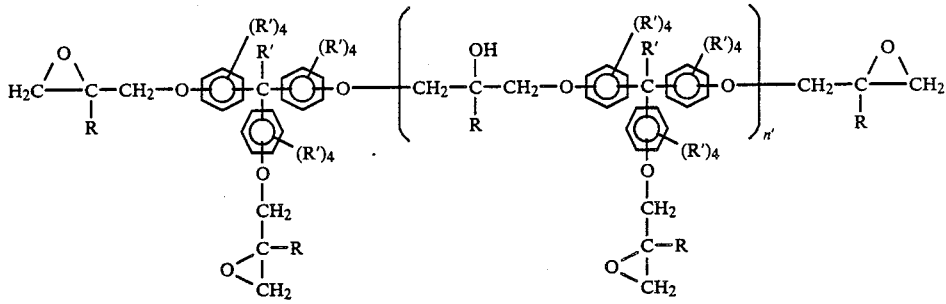

FORMULA V

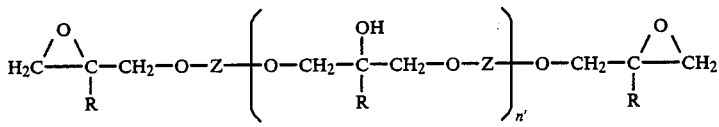

wherein A is selected from the group consisting of divalent hydrocarbon groups having 1-12 carbons,

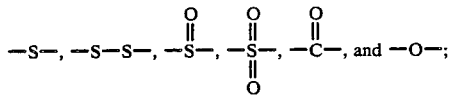

Z is a hydrocarbyl group having 1-15 carbons or a group having the formula $-C(R'')_2-C(R''-)_2-[O-C(R'')_2-C(R'')_2]-_{m'}$;

A' is a divalent hydrocarbon group having 1-3 carbons or a group having the formula

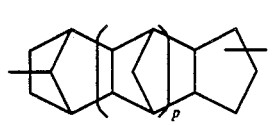

p is 0 to 10;

R' is independently hydrogen, a hydrocarbyl or hydrocarbyloxy group having 1-18 carbons or a halogen;

R is independently hydrogen or a hydrocarbyl group having 1-3 carbons;

R" is independently hydrogen or a hydrocarbyl group having 1-6 carbons;

n is 0 or 1;

n' has an average value from zero to about 40;

m has an average value from about 0.001 to about 6; and m' has a value from 1 to about 100.

4. A curable composition comprising the epoxy resin composition of claim 1 with an effective amount of a curing agent to cure said composition.

5. A curable composition comprising the epoxy resin composition of claim 2 with an effective amount of a curing agent to cure said composition.

6. A curable composition comprising the epoxy resin composition of claim 3 with an effective amount of a curing agent to cure said composition.

7. The cured product of claim 4.

8. The cured product of claim 5.

9. The cured product of claim 6.

10. A process for preparing an aromatic polycarbonate modified epoxy resin wherein (1) at least one epoxy resin and (2) at least one aromatic polycarbonate resin or oligomer are reacted together at a time and temperature sufficient to induce formation of one or more carbonate linkages on said epoxy resin thus providing chain branching and/or crosslinking and wherein component (2) is present in an amount of from about 0.1 to 10.0% by weight based on the combined weights of components (1) and (2).

11. The process of claim 10 wherein a reaction time of at least about 15 minutes is used and a reaction temperature of at least about 75° C. is used.

12. The process of claim 10 wherein one or more polyphenols are additionally present before or during the reaction in an amount of from about 0.01 to about 0.99 hydroxyl equivalents per epoxide equivalent contained in component (1).

13. The process of claim 12 wherein component (2) is first added to component (1) and substantially dissolved therein followed by addition of said polyphenol.

14. The process of claim 12 wherein said polyphenol is first added to component (1) followed by addition of component (2).

15. The process of claim 12 wherein from about 0.01 to about 0.75 hydroxyl equivalents per epoxide equivalent contained in component (1) of said polyphenol is first added to component (1) and substantially dissolved therein followed by addition of component (2) which is substantially dissolved therein followed by addition of from about 0.24 to about 0.98 hydroxyl equivalents per epoxide equivalent contained in component (1) of said polyphenol.

16. The process of claim 10 wherein one or more monoalcohols or monophenols are additionally present in an amount of from about 1.0 to about 250 percent by weight based on the weight of component (2).

17. The process of claim 16 wherein component (1) and said monoalcohols or monophenols are contacted together prior to addition of component (2).

18. The process of claim 12 wherein one or more monoalcohols or monophenols are additionally present in an amount of from about 1.0 to about 250 percent by weight based on the weight of component (2).

19. The process of claim 18 wherein components (1), (2) and said monoalcohols or monophenols are contacted together prior to addition of said polyphenol.

20. The process of claims 10, 11, 12, 13, 14, 15 or 16 wherein one or more solvents substantially inert to reaction with epoxide groups and the carbonate linkage are additionally present.

21. The process of claim 20 wherein said solvent is used to dissolve or slurry component (2) prior to its addition to the reaction mixture.

22. The process of claims 10, 11, 12, 13, 14, 15, 16, 17, 18 or 19 wherein a catalytic amount of one or more advancement catalysts are additionally present.

23. The process of claims 10, 11, 12, 13, 14, 15, 16, 17, 18, 19, 20, 21 or 22 wherein a catalytic amount of one or more transesterification catalysts are additionally present.

* * * * *